Jan. 6, 1953 J. M. THOM 2,624,353
APPARATUS FOR SALVAGING BEEHIVE FRAMES AND BEESWAX
Filed March 4, 1949
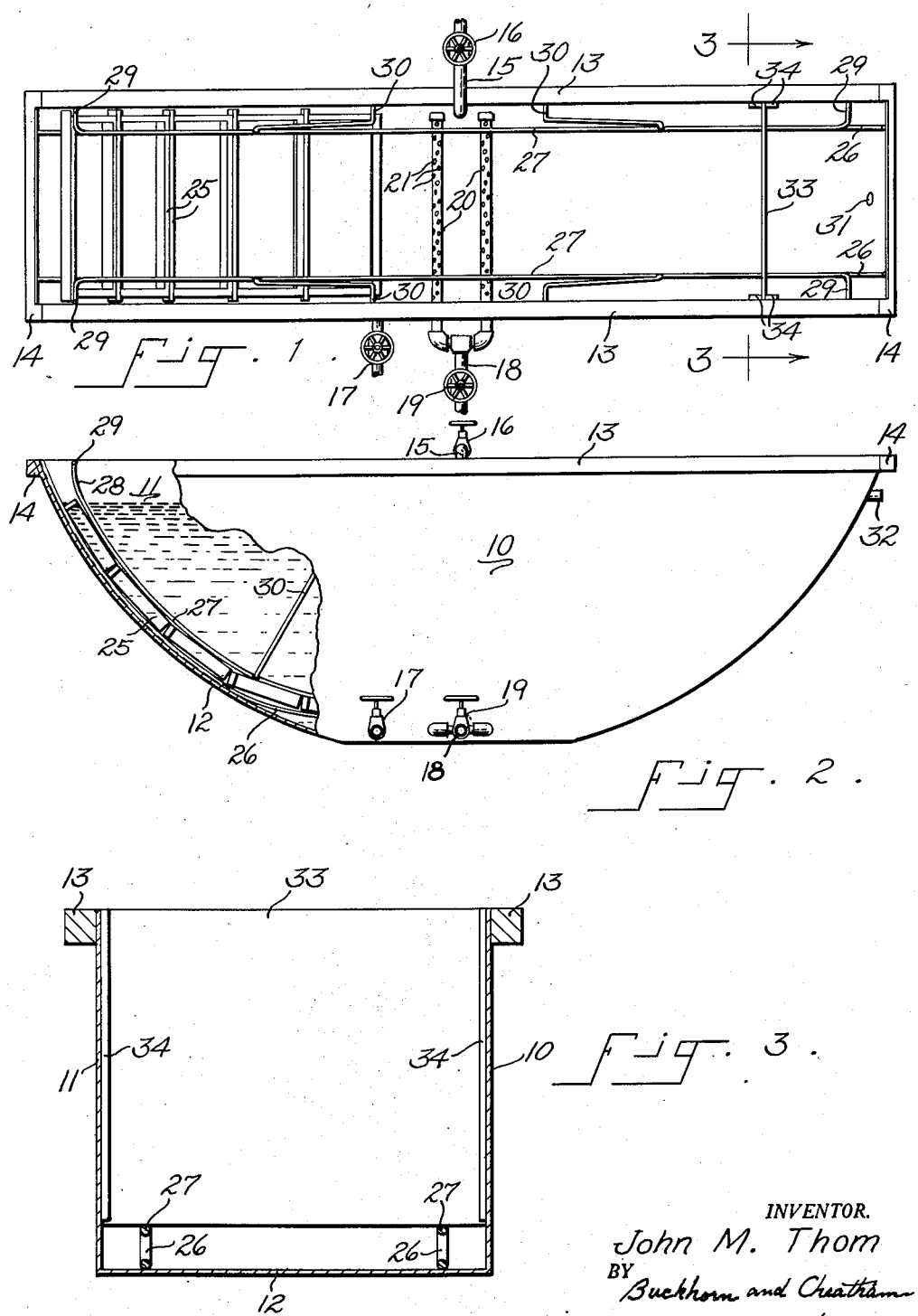
INVENTOR.
John M. Thom
BY
Buckhorn and Cheatham
Attorneys Patented Jan. 6, 1953

2,624,353

UNITED STATES PATENT OFFICE 2,624,353

APPARATUS FOR SALVAGING BEEHIVE FRAMES AND BEESWAX

John M. Thom, Haines, Oreg.

Application March 4, 1949, Serial No. 79,635

3 Claims. (Cl. 134—94)

The present invention comprises apparatus for salvaging used beehive frames in such manner as to salvage beeswax therefrom. Beehive frames used in modern apiaries are expensive, hence attempts are made to salvage them rather than to purchase new frames after each crop is harvested. In order to salvage the frames it is necessary that they be thoroughly cleansed of deposited beeswax and sterilized in order to kill bacteria, fungi and parasites which attack bees. The cleaning must be done without the use of toxic solvents or other means which might impart a flavor to the honey or render the frames offensive to bees, hence the usual method is to boil or steam the frames, such treatment resulting in the melting of the beeswax which is then salvaged. Apparatus which has heretofore been made for achieving this objective is crude and, for some reason, may result in the formation of crumbly or powdered beeswax. Since beeswax has quite a high market value if of good quality, it is highly desirable that the cleaning and salvaging operation should produce firm beeswax of good market value. The object of the present invention is to provide means for cleaning and sterilizing the beehive frames without warping or otherwise detrimentally affecting the frames, which apparatus also produces uniformly clear beeswax of high market value.

The objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawing,

Fig. 1 is a plan view of the present invention showing several beehive frames inserted therein;

Fig. 2 is a side elevation of the invention, with a portion broken away; and

Fig. 3 is a vertical section, on an enlarged scale, taken along line 3—3 of Fig. 1.

The invention comprises a tank in which water may be maintained in heated condition, the tank preferably comprising a pair of vertical side walls 10 and 11 spaced sufficiently apart to permit the insertion of beehive frames with the long dimension of the frames extending laterally across the tank. The side walls are preferably in the shape of segments of a circle with the lowermost portions thereof struck off along a chord parallel to the top edge. The side walls are joined along their lower edges by a bottom wall 12 which is flattened at the lowermost portion and upwardly curved toward each end so that the tank is increasingly shallow toward each end and is of the greatest depth above a substantial area which is flattened in order that the tank may rest evenly upon a supporting surface, which supporting surface may be the top of a stove or fireplace. The upper edges of the walls are preferably reinforced by longitudinal bars 13 and lateral bars 14 forming a rectangular frame.

The tank is preferably installed in some location where it may be set beneath a source of water supply such as the inlet pipe 15 controlled by valve 16 in order that the tank may be initially filled and supplied with make-up water. A drain valve 17 is preferably provided in one side wall near the lowest portion thereof. The tank is preferably provided with an inlet means for the introduction of steam, such means preferably comprising a pipe 18 under control of a valve 19, the pipe having two branch pipes 20 extending therefrom laterally across the bottom of the tank. Each of the pipes is preferably provided with a plurality of upwardly directed small openings 21 through which steam may be admitted to heat the water or to maintain the water in heated condition if it is initially heated by external means, and to create upwardly directed turbulence adjacent the deepest portion of the tank. Although it is primarily intended that steam be admitted as the heating and turbulence creating means, it is to be appreciated that the apparatus will operate when heated by external means alone, since the heating action will be confined to the deepest central portion of the tank and the convection currents and steam action will be upward through the central portion of the tank and downward along the curved, shallow ends.

In order that the beehive frames may be passed through the apparatus, guiding means are provided adjacent each side wall, the guiding means being so arranged as to receive and guide the end portions of a series of frames such as the frames 25 indicated in Figs. 1 and 2. The preferred form of guiding means herein illustrated comprises a vertically spaced pair of guide rods. The lower guide rod 26 of each pair generally follows the contour of the bottom wall 12 but is spaced from the lowermost portion thereof so that the pipes 20 extend beneath the guide rods 26. The upper guide rod 27 of each pair is generally spaced from the lower guide rod by a little less than the thickness of a beehive frame. The ends of each upper guide rod are curved away from the lower guide rods as at 28 so as to provide a wide mouth to facilitate insertion and withdrawal of the frames. Each end of each upper guide rod is then bent laterally at 29 to provide a portion which may be attached to the members 13. In order that the intermediate portion of the upper guide rod may be supported, a pair of supporting rods 30 are provided, the same being bent laterally at their upper ends and attached to the members 13. The supporting rods 30 are preferably arranged with the points of attachment to the members 13 being laterally displaced from the points of attachment to the upper guide rods so that the upper guide rods may spring upwardly to a slight extent. The guide rods are preferably resilient to some extent, preferably being formed of quarter-inch steel rod. The combined spring effect permitted by the resilience of the rods and the method of mounting the upper guide rods permits the upper and lower guide rods to give slightly as the frames are forced therebetween, the guides thereby frictionally holding the frames from floating upwardly at either end of the tank. In order that the device may be used to capacity, the operator standing at one end inserts a series of frames one after the other, the first ones being pushed through the apparatus by the succeeding ones. The arrangement is such that by the time a frame reaches the center of the tank the beeswax has been thoroughly melted and has mostly floated to the top of the tank. The upwardly directed jets of steam thorough cleanse the frames. The top of the tank is preferably open in order that the last of a series of frames may be propelled through the apparatus by a stick or pusher extended downwardly through the water.

The beeswax which is separated from the frames is forced upwardly to the surface of the water and then follows the convection currents outwardly toward either end of the tank, collection of the beeswax thus being accomplished in areas of comparative quiescence, thus producing beeswax of finer quality. The beeswax may be continuously skimmed from the tank or collected from time to time.

In order that the level of the water may be maintained at the desired height an outlet opening 31 is provided at one end of the bottom wall 12, the same being preferably surrounded by means such as a nipple 32 which may be connected to a drain hose or the like. In order to prevent loss of beeswax the portion of the tank adjacent the outlet opening is separated from the remainder of the tank by a baffle plate 33 which extends laterally from side wall 10 to side wall 11 and vertically from adjacent the upper guide rails 27 to the top of the tank. The baffle may be fixed in position, but it is preferably maintained in sliding contact with the side walls by vertical guides 34 in order that the baffle may rise and fall if the upper guide rod gives to accommodate the frame.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. Apparatus for salvaging beehive frames in such manner as to salvage beeswax therefrom, comprising a tank in which a body of water may be maintained in heated condition, first guiding means extending downwardly and then upwardly along a curved path from one edge portion of the tank to an opposed edge portion, second guiding means horizontally spaced from and parallel to said first guiding means, said guiding means being adapted to guide a series of beehive frames therebetween, an overflow outlet adjacent the ends of said guiding means at one side of the tank, and a baffle near said outlet extending upwardly from adjacent said guiding means to a level above said outlet, said baffle separating a portion of the tank adjacent said outlet from the remainder thereof.

2. Apparatus for salvaging beehive frames in such manner as to salvage beeswax therefrom, comprising a tank in which a body of water may be maintained in heated condition, a first pair of vertically spaced, resilient rods extending downwardly and then upwardly along a curved path from one edge portion of the tank to an opposed edge portion, a second pair of similar rods horizontally spaced from and parallel to said first pair of rods, the rods of each pair being so spaced vertically and the pairs of rods being so spaced horizontally as to permit the insertion of beehive frames between the upper and lower rods with portions thereof extending between the pairs of rods, and means resiliently supporting the upper rods whereby said upper rods may yield and permit said rods frictionally to grip beehive frames therebetween.

3. Apparatus for salvaging beehive frames in such manner as to salvage beeswax therefrom, comprising a tank in which water may be maintained in heated condition, said tank having a pair of vertical side walls and a bottom wall, the bottom wall being inclined upwardly toward each end of the tank to provide sloping end walls, guiding means adjacent each side wall generally following the contour of said bottom wall and being arranged to provide spaced tracks for guiding beehive frames therebetween with the frames extending laterally between the side walls of the tank, said side walls being spaced slightly wider apart than the width of the standard beehive frame, means adjacent the lowermost portion of said bottom wall for creating turbulence of water contained in said tank, said means being arranged beneath said guiding means whereby beeswax on said frames in a melted state will be dislodged from the frames, an overflow outlet at one end of said bottom wall, and a baffle near said overflow outlet extending laterally from one side wall to the other side wall, said baffle extending vertically from adjacent said guiding means to a level above said overflow outlet.

JOHN M. THOM.

REFERENCES CITED

The following references are of record in the file of this patent:

UNITED STATES PATENTS

| Number | Name | Date |
| --- | --- | --- |
| 211,865 | Schock | Feb. 4, 1879 |
| 755,626 | Danner | Mar. 29, 1904 |
| 829,547 | Schwarzenbach | Aug. 28, 1906 |
| 1,646,570 | Atwood et al. | Oct. 25, 1927 |
| 1,702,613 | Morse | Feb. 19, 1929 |
| 1,716,165 | Cole et al. | June 4, 1929 |
| 1,757,103 | Voight | May 6, 1930 |
| 1,801,262 | Boosey | Apr. 21, 1931 |
| 1,915,733 | Hand | June 27, 1933 |
| 1,942,355 | Dinley | Jan. 2, 1934 |
| 2,092,938 | Stebler | Sept. 14, 1937 |
| 2,114,782 | Kohler | Apr. 19, 1938 |
| 2,216,544 | True et al. | Oct. 1, 1940 |
| 2,259,278 | Theiss | Oct. 14, 1941 |
| 2,311,391 | Herold | Feb. 16, 1943 |
| 2,413,144 | King | Dec. 24, 1946 |
| 2,422,656 | Carter | June 24, 1947 |
| 2,520,304 | Brand | Aug. 29, 1950 |

FOREIGN PATENTS

| Number | Country | Date |
| --- | --- | --- |
| 175,266 | Germany | Aug. 28, 1906 |
| 187,715 | Germany | July 1, 1907 |